(12) United States Patent
Charpentier et al.

(10) Patent No.: US 9,594,843 B2
(45) Date of Patent: Mar. 14, 2017

(54) IDENTIFYING AN INCORRECT ENTRY AT AN IMAGING CHECKOUT TERMINAL

(71) Applicant: NCR Corporation, Duluth, GA (US)

(72) Inventors: Peter R. Charpentier, Suwanee, GA (US); Jason Rambler, Decatur, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/669,814

(22) Filed: Mar. 26, 2015

(65) Prior Publication Data

US 2016/0283602 A1    Sep. 29, 2016

(51) Int. Cl.
*G06K 15/00* (2006.01)
*G06F 17/30* (2006.01)

(52) U.S. Cl.
CPC .............. *G06F 17/30876* (2013.01)

(58) Field of Classification Search
CPC .... G07G 1/0054; G07G 1/0036; G07G 3/003; G07G 1/0045; G06Q 10/087; G06Q 20/20; G06Q 20/203
USPC .......... 235/383, 385; 705/16, 22, 23
See application file for complete search history.

(56) References Cited

U.S. PATENT DOCUMENTS 7,059,527 B2 * 6/2006 Mergenthaler ....... G06K 7/1096
235/383
2009/0026269 A1 * 1/2009 Connell, II ....... G06F 17/30244
235/462.41

* cited by examiner

*Primary Examiner* — Jamara Franklin
(74) *Attorney, Agent, or Firm* — Schwegman, Lundberg & Woessner (57) ABSTRACT

A store can stock items that have the same appearance but have different prices. For instance, organic bananas can look like conventional bananas, but can be priced higher than conventional bananas. In some examples, a higher-priced item can be tagged with an identifier, which can include a visual cue that indicates, to the naked eye, that the item is higher-priced. For instance, organic bananas can include tape that visually indicates that the bananas are organic. In some examples, the problem of a person purchasing a higher-priced item at an imaging checkout terminal, but selecting a price of a corresponding lower-priced but visually similar item, can be overcome by capturing an image of the purchased item, determining from the image that an identifier is attached to the item, determining that a lower-priced item is selected at the terminal, and producing an alert for an attendant.

20 Claims, 5 Drawing Sheets

IDENTIFYING AN INCORRECT ENTRY AT AN IMAGING CHECKOUT TERMINAL

BACKGROUND

A store can stock items that have the same appearance but have different prices. For instance, organic bananas can look like conventionally-grown bananas, but can be priced higher than conventionally-grown bananas. At a checkout terminal in the store, it can be difficult to ensure that a presented item is not a higher-priced, but visually similar, item. For instance, it can be difficult to ensure that a customer weighing organic bananas at a self-checkout terminal keys in or selects organic bananas at the self-checkout terminal, rather than selecting lower-priced conventionally-grown bananas.

SUMMARY

A method is discussed for identifying an incorrect entry at a checkout terminal. The checkout terminal can determine from an image of a presented item that an identifier is attached to the presented item. The identifier can include visible indicia indicating that the presented item is one of a plurality of visually similar items. The checkout terminal can receive a selection of a selected item from the plurality of visually similar items. The checkout terminal can determine that the presented item differs from the selected item. The checkout terminal can generate an alert output indicating that the presented item differs from the selected item.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

A store can stock items that have the same appearance but have different prices. For instance, organic bananas can look like conventionally-grown bananas, but can be priced higher than conventional bananas.

In some examples, a higher-priced item can be tagged with an identifier, which can include a visual cue that indicates, to the naked eye, that the item is higher-priced. For instance, organic bananas can include tape that visually indicates that the bananas are organic. A customer can see the tape, and can determine readily from the tape that the bananas are organic. An employee can see the tape, and determine readily from the tape whether a particular bunch of bananas has been incorrectly placed in a display.

A checkout terminal in the store can use the presence of the identifier to ensure that a customer is charged the higher price. For instance, a checkout terminal can sense the presence of the tape on the organic bananas, and can generate an alert if a customer or employee attempts to select lower-priced conventionally-grown bananas at the checkout terminal. In some examples, an attendant can respond to the alert. The attendant can correct the entry at the checkout terminal, or can advise the customer or employee to correct the entry at the checkout terminal. In this manner, the checkout terminal can reduce financial loss for the store.

For items that can be visually indistinguishable, such as produce items of the same species but grown under different circumstances, the presence or absence of an identifier may be the only way to visually tell them apart. For items that are visually close but not indistinguishable, such as different varieties of grapes, detecting a presence or absence of an identifier in an image can require less computation than directly identifying the items from the image.

The preceding paragraphs merely summarize various elements of some embodiments, and should not be construed as limiting in any way. These and other embodiments are further described herein with reference to the figures.

Figure 1:
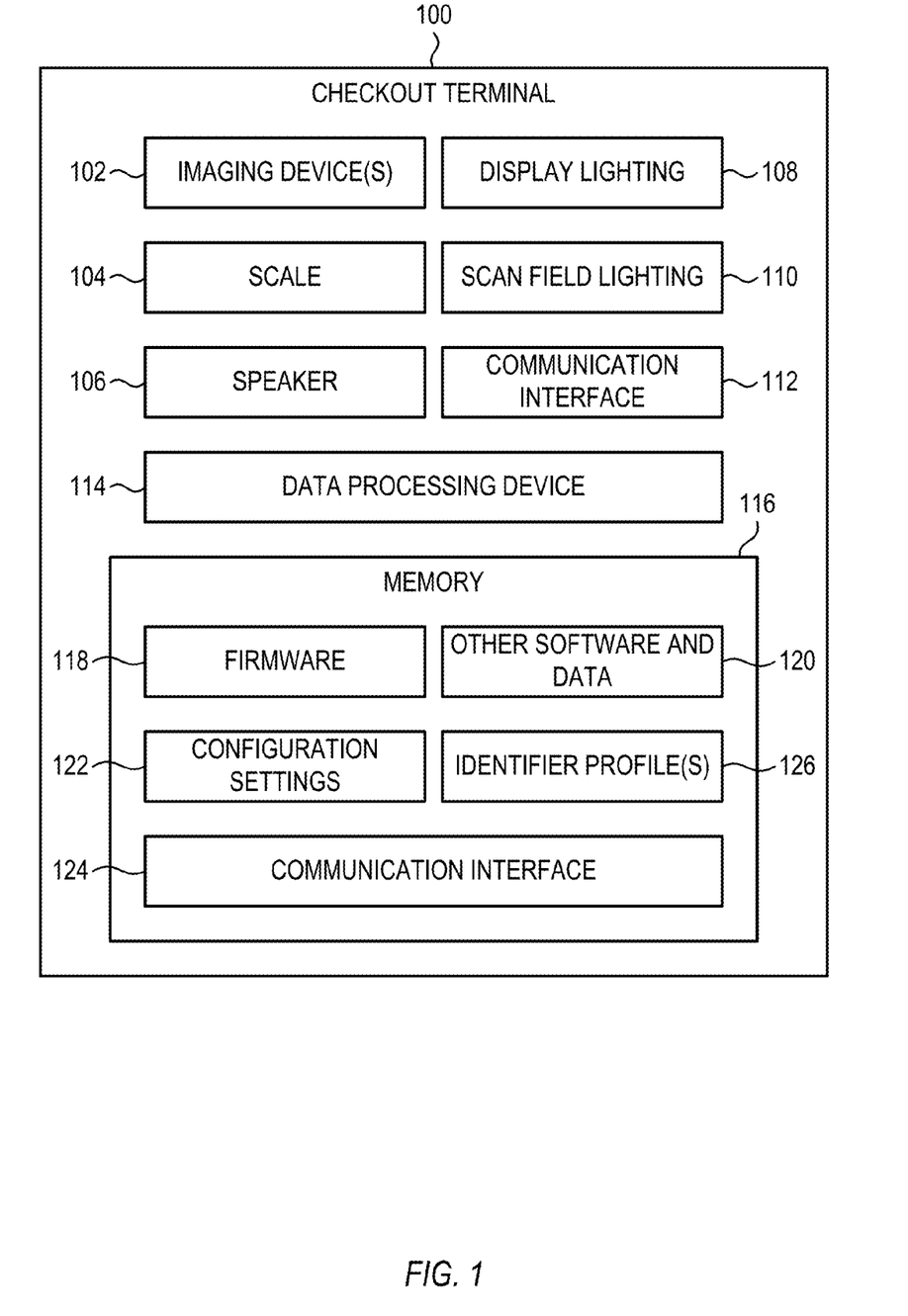
FIG. 1 shows a block diagram of an example of a checkout terminal, in accordance with some embodiments.

FIG. 1 shows a block diagram of an example of a checkout terminal 100, in accordance with some embodiments. In some examples, checkout terminal 100 can be configured as a self-checkout terminal. In other examples, checkout terminal 100 can be operated by an employee of the store.

Checkout terminal 100 can include one or more imaging devices 102. Each imaging device 102 can include a cover glass, which can face a checkout clerk during use. In some examples, more than one imaging device can share a single cover glass. Each imaging device 102 can include one or more focusing elements, such as a lens or a curved mirror, which can form an image of an area or volume proximate the cover glass. During use of the checkout terminal 100, a checkout clerk can scan items through the area or volume proximate the cover glass. Each imaging device 102 can include a camera, which can convert the image of the area or volume into a video signal. Each imaging device 102 can optionally include one or more folding mirrors, which can redirect or fold an optical path between a camera and the cover glass within a housing of the checkout terminal 100, and can therefore reduce a volume required for the optical path within the housing of the checkout terminal 100. In some examples, the checkout terminal 100 can include more than one imaging device 102, to image an item scanned through the area or volume from more than one direction.

Checkout terminal 100 can optionally include one or more additional elements that can assist with the task of processing purchased items in a checkout transaction. A scale 104 can use a horizontal cover glass, or another suitable horizontal surface, to weigh produce or other grocery items that are sold be weight. A speaker 106 can emit a beep, or other suitable tone, to indicate a successful scan of an item. The speaker 106 can optionally emit a beep of a different pitch or different tone, to indicate an unsuccessful scan of an item. Display lighting 108 can emit a visual signal, such as a green light or a non-blinking light, to indicate a successful scan of an item. Display lighting 108 can emit a different visual signal, such as a red light or a blinking light, to indicate an unsuccessful scan of an item. Scan field lighting 110 can be switched on and off as needed, and optionally adjusted based on a detected presence of an item to be scanned. A communication interface 112 can include a screen or display facing a checkout clerk, and can optionally include an additional screen facing a customer. The communication interface 112 can optionally include an input device, such as a touch-sensitive screen, or a keypad for entering PINs and other data. The communication interface 112 can optionally include a swipe element for swiping credit cards.

During use, the checkout terminal 100 operates according to instructions executed on a data processing device 114, such as a processor. The data processing device 114 can include one or more of an application integrated circuit (ASIC), a digital signal data processing device, a microdata processing device, or another suitable type of data processing device. Some or all of the instructions can be embedded in firmware 118. Some or all of the instructions can be included in software 120 stored in memory 116. Memory 116 can include one or more of volatile memory, non-volatile memory, write-protected memory, write-once memory, random access memory (RAM), read only memory (ROM), secure memory, and other memory and data storage types and devices.

Configuration settings 122 can configure operation of the checkout terminal 100 and its components. For example, the configuration settings 122 can control units of the scale 104, a volume of the speaker 106, a brightness of the display lighting 108, a decoding algorithm of the one or more imaging devices 102, one or more communication protocols used to communicate data from the checkout terminal 100 to a checkout device or other network via wired or wireless connections, a version of firmware 118, a version of software 120, and/or other suitable settings.

A communication interface 124 can allow the checkout terminal 100 to communicate with one or more wired or wireless networks or devices. For instance, the communication interface 124 can communicate with a barcode scanner disposed in a checkout station with the checkout terminal 100.

Memory 116 also can include one or more identifier profiles 126. Each identifier profile 126 can be recognized by the checkout terminal 100. Each identifier profile 126 can be used to determine from an image of a presented item that a corresponding identifier is attached to the presented item. For instance, an example of an identifier profile 126 can be tape that includes the word organic. The checkout terminal 100 can receive an image of a presented item. The checkout terminal 100 can process the image to determine if such tape is present in the image. The checkout terminal 100 can receive a selection of a selected item from the plurality of visually similar items. If the presented item differs from the selected item, the checkout terminal can generate an alert output indicating that the presented item differs from the selected item. In some examples, the generating the alert output can include triggering a visible or audible warning signal at a station spaced apart from the checkout terminal 100. An attendant can respond to the warning signal, and can approach the checkout terminal 100. The attendant can correct the entry at the checkout terminal 100, or can advise the customer or employee to correct the entry at the checkout terminal 100.

In some examples, the identifier profiles 126 can be stored as a lookup table or a database. The lookup table or database can include data representing each identifier profile 126. The data can be used by the checkout terminal 100 to decide if indicia from an identifier are present in a particular image. In some examples, the data can include a color of an identifier. In some examples, the data can include a shape of an identifier. In some examples, the data can include a word or arrangement of characters displayed on an identifier. In some examples, an identifier profile 126 can include or more images of the identifier, which can optionally show different views of the identifier. In some examples, the lookup table or database can be updated after deployment, which can allow particular identifiers to be entered, removed, or modified as needed.

In some examples, a checkout terminal, such as 100, can include a display, which can be included with communication interface 112. The checkout terminal can further include an input device, which can also be included with communication interface 112. The checkout terminal can further include a camera, which can be included with imaging device 102. The checkout terminal can further include at least one data processing device 114 coupled to the display, the input device, and the camera. The checkout terminal can further include at least one memory device, such as 116. The at least one memory device can store instructions executable by the at least one data processing device 114. The instructions can be executable by the at least one data processing device 114 to perform data processing activities. The data processing activities can include capturing, with the camera, an image of a presented item. The data processing activities can further include determining, with the at least one data processing device 114, from the image that an identifier is attached to the presented item. The identifier can include visible indicia indicating that the presented item is one of a plurality of visually similar items. The data processing activities can further include rendering a user interface on the display. The user interface can be configured to present the plurality of visually similar items. The data processing activities can further include receiving, at the input device, a selection of a selected item from the plurality of visually similar items. The data processing activities can further include determining, with the at least one data processing device 114, that the presented item differs from the selected item. The data processing activities can further include generating an alert output indicating that the presented item differs from the selected item.

There are various mechanisms for triggering the checkout terminal 100 to look for an identifier in an image captured by the imaging device 102, any or all of which can be used in combination. In some examples, the checkout terminal 100 can capture an image from the imaging device 102 when an operator places a produce item on the scale, such as when the scale 104 reaches stability and records a non-zero weight. In some examples, the checkout terminal 100 can capture an image from the imaging device 102 when an operator selects a produce item from the communication interface 112. In some examples, the checkout terminal 100 can capture an image from the imaging device 102 when an operator selects an item from the communication interface 112, where the selected item is visually similar to a higher-priced item. In some examples, the checkout terminal 100 can capture an image from the imaging device 102 periodically, such as at regular or irregular time intervals during use of the checkout terminal 100. These are but examples of suitable triggers; any other suitable trigger can also be used. When the checkout terminal 100 captures an image, such as in response to a suitable trigger, the checkout terminal 100 can analyze the image with respect to the identifier profiles 126, to determine if an identifier is present in the image.

The checkout terminal 100 of FIG. 1 is but one example of a checkout terminal; other suitable checkout terminals can also be used.

Figure 2:
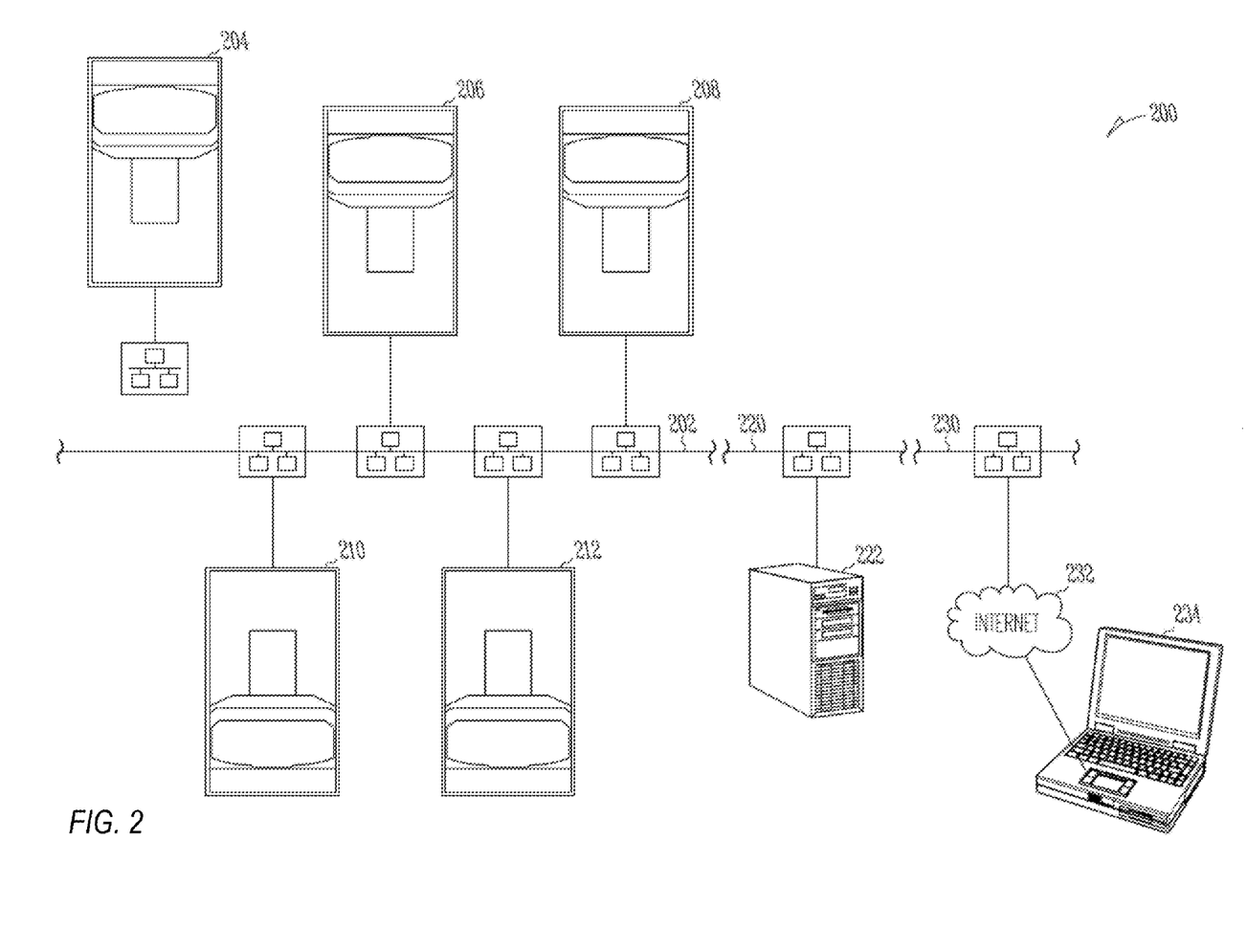
FIG. 2 shows an example of a networked system, in accordance with some embodiments.

FIG. 2 shows an example of a networked system 200, in accordance with some embodiments. Networked system 200 can include one or more components connected to a network segment 202. The network segment 202 can be a stand-alone network, such as a network within a retail outlet. The network segment 202 can also be part of a larger network that includes additional network segments 220, 230. For example, the network segment 202 can be a store-based network that is also coupled to a corporate network segment 220. The corporate network segment 220 can further be coupled to an Internet 232 network segment 230.

The network segment 202 can include a plurality of scanners 206, 208, 210, 212 connected to the network segment 202. Although not illustrated and not required in some embodiments, the scanners 206, 208, 210, 212 may also each be individually coupled to terminals, such as checkout terminals, self-service kiosks, and the other types of terminals discussed elsewhere herein. The system 200 can also include a scanner 204 that has not yet been connected to the network segment 202. Once the scanner 204 is connected to the network segment 202, the scanner 204 may also communicate over the network segment 202.

In some embodiments, the scanners 204, 206, 208, 210, 212 communicate image and video data they capture over the network either in response to a request from a server 222 or computer 234. In other embodiments, the image and video data may be communicated to the server 222 or other network location as the video is captured or at a defined interval according to scanner configuration settings.

Figure 3:
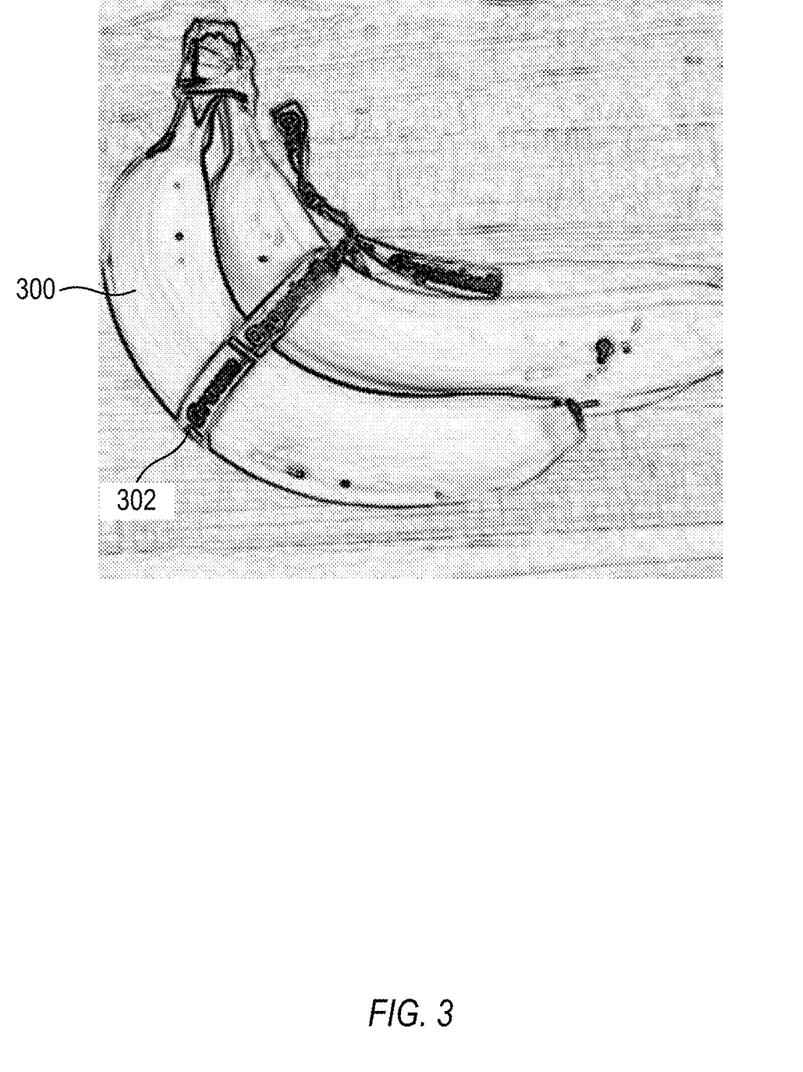
FIG. 3 shows an example of an identifier attached to a presented item, in accordance with some embodiments.

FIG. 3 shows an example of an identifier 302 attached to a presented item 300, in accordance with some embodiments. Presented item 300 can be an item brought by a customer to a checkout terminal for purchase. In the example of FIG. 3, presented item 300 is a bunch of organic bananas. This is but one example of a presented item; other suitable presented items can also be used.

In some examples, presented item 300 can be one of a plurality of visually similar items. For instance, the plurality can include organic bananas and conventionally-grown bananas, which can be visually similar to each other. In some examples, the plurality of visually similar items can include at least one item having a designation of certified-organic and at least one item lacking a designation of certified-organic. In some examples, the plurality of visually similar items can include different varieties of a single species of produce. In some examples, the plurality of visually similar items can include items priced differently.

Identifier 302 can be attached to the presented item 300. Examples of suitable identifiers can include a sticker adhered to the presented item 300, tape adhered to the presented item 300, tape adhered in a loop around at least a portion of the presented item 300, a wrapper surrounding at least a portion of the presented item 300, and others. Identifier 302 can include visible indicia indicating that the presented item 300 is one of a plurality of visually similar items. Examples of suitable visible indicia can include a logo, a word, a shape, a color, and others. In some examples, such as the example of FIG. 3, the visible indicia can include the word organic.

In some examples, the plurality of visually similar items can include two items. In some examples, the plurality can include one item designated as certified-organic and one item lacking a designation of certified-organic. In some examples, the plurality can include two or more produce items having different species, such as different varieties of grapes. In some examples, one or more of the different species can also include an optional designation of certified-organic.

Figure 4:
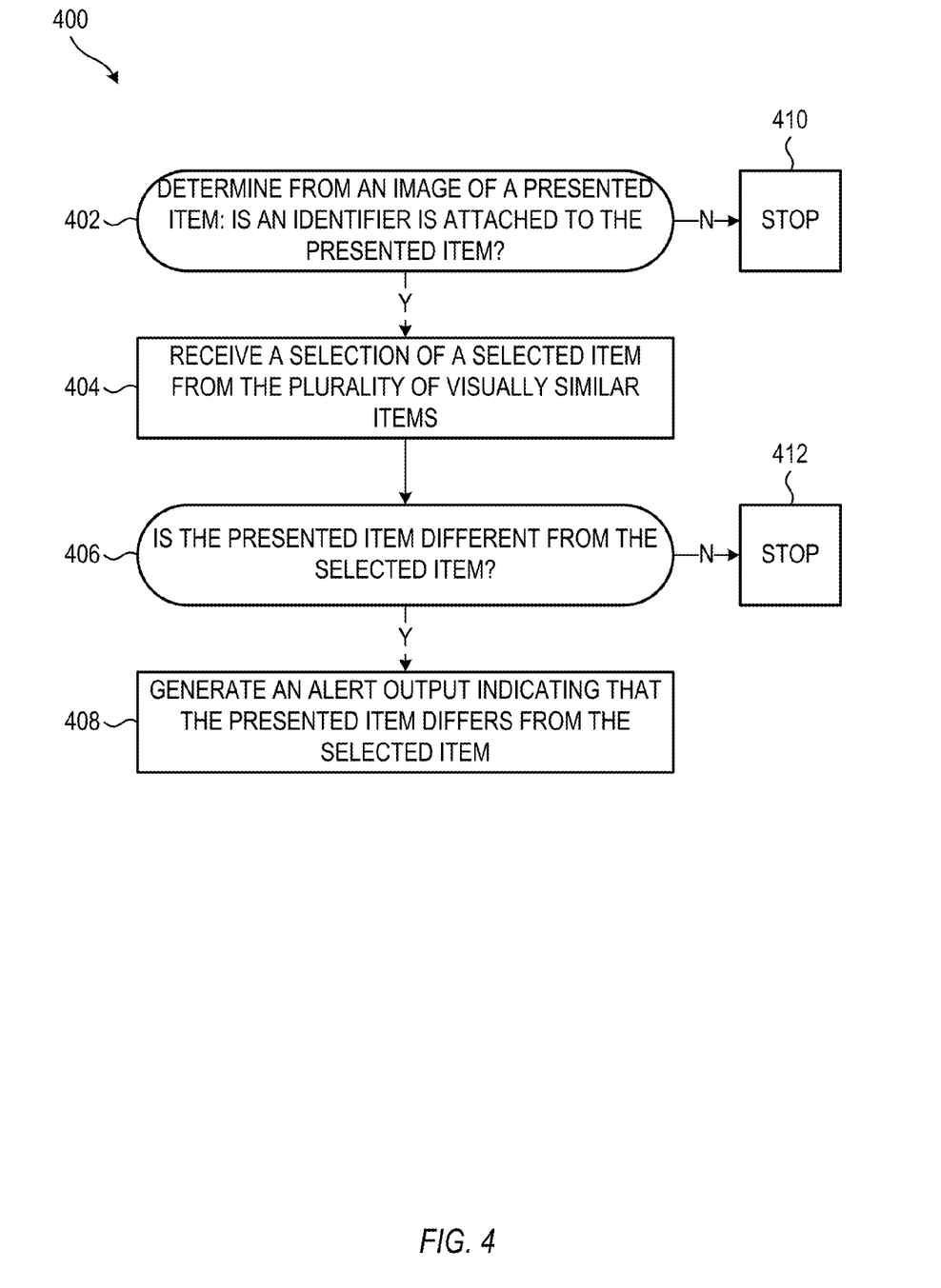
FIG. 4 shows a flow chart of an example of a method for identifying an incorrect entry at a checkout terminal, in accordance with some embodiments.

FIG. 4 shows a flow chart of an example of a method 400 for identifying an incorrect entry at a checkout terminal, in accordance with some embodiments. The method 400 can be executed on a checkout terminal, such as 100 (FIG. 1), on a system that includes a checkout terminal, or on another suitable device. The method 400 is but one example of a method for identifying an incorrect entry at a checkout terminal; other suitable methods can also be used.

At operation 402, a checkout terminal can determine from an image of a presented item if an identifier is attached to the presented item. In some examples, the identifier can include at least one of a sticker adhered to the presented item, tape adhered to the presented item, tape adhered in a loop around at least a portion of the presented item, or a wrapper surrounding at least a portion of the presented item. The identifier can include visible indicia indicating that the presented item is one of a plurality of visually similar items. In some examples, the visible indicia can include at least one of a logo, word, shape and color. In some examples, the visible indicia can include the word organic. If there is no identifier attached to the presented item, method 400 can stop at operation 410, and normal checkout operation of the checkout terminal can resume. If an identifier is attached to the presented item, method 400 can proceed to operation 404.

At operation 404, the checkout terminal can receive a selection of a selected item from the plurality of visually similar items. In some examples, the selection can be received as input at an input device coupled to the checkout terminal. In some examples, the plurality of visually similar items can include at least one item having a designation of certified-organic and at least one item lacking a designation of certified-organic. In some examples, the plurality of visually similar items can include different varieties of a single species of produce. In some examples, the plurality of visually similar items can include items priced differently. In some examples, the selected item can have a lower price than the presented item.

At operation 406, the checkout terminal can determine if the presented item differs from the selected item. If the presented item is the same as the selected item, method 400 can stop at operation 412, and normal checkout operation of the checkout terminal can resume. If the presented item differs from the selected item, method 400 can proceed to operation 408.

At operation 408, the checkout terminal can generate an alert output indicating that the presented item differs from the selected item. In some examples, generating the alert output can include triggering a visible or audible warning signal at a station spaced apart from the checkout terminal.

In some examples, method 400 can further include capturing the image of the presented item with an imaging device coupled to the checkout terminal.

Figure 5:
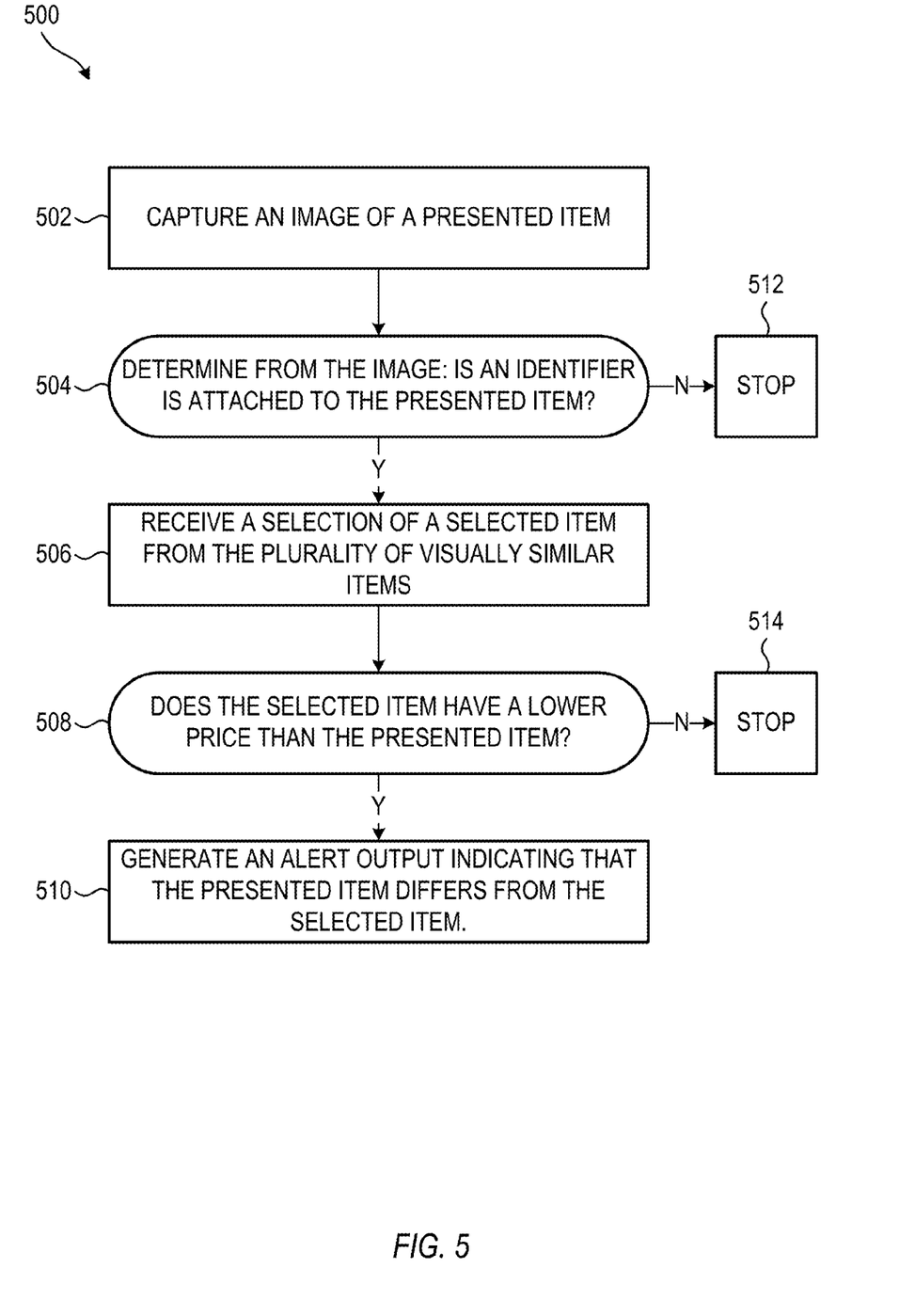
FIG. 5 shows a flow chart of another example of a method for identifying an incorrect entry at a checkout terminal, in accordance with some embodiments.

FIG. 5 shows a flow chart of an example of a method 500 for identifying an incorrect entry at a checkout terminal, in accordance with some embodiments. The method 500 can be executed on a checkout terminal, such as 100 (FIG. 1), on a system that includes a checkout terminal, or on another suitable device. The method 500 is but one example of a method for identifying an incorrect entry at a checkout terminal; other suitable methods can also be used.

At operation 502, a checkout terminal can capture an image of a presented item. In some examples, the image can be captured with an imaging device coupled to the checkout terminal.

At operation 504, the checkout terminal can determine from the image if an identifier is attached to the presented item. The identifier can include visible indicia indicating that the presented item is one of a plurality of visually similar items. In some examples, the visible indicia can include at least one of a logo, word, shape and color. In some examples, the visible indicia can include the word organic. In some examples, the plurality of visually similar items can include at least one item having a designation of certified-organic and at least one item lacking a designation of certified-organic. If there is no identifier attached to the presented item, method 500 can stop at operation 512, and normal checkout operation of the checkout terminal can resume. If an identifier is attached to the presented item, method 500 can proceed to operation 506.

At operation 506, the checkout terminal can receive a selection of a selected item from the plurality of visually similar items. In some examples, the selection can be received as input at an input device coupled to the checkout terminal.

At operation 508, the checkout terminal can determine if the selected item has a lower price than the presented item. If the presented item is the same as the selected item, method 500 can stop at operation 514, and normal checkout operation of the checkout terminal can resume. If the presented item differs from the selected item, method 500 can proceed to operation 510.

At operation 510, the checkout terminal can generate an alert output indicating that the presented item differs from the selected item. In some examples, generating the alert output can include triggering a visible or audible warning signal at a station spaced apart from the checkout terminal.

Some embodiments may be implemented in one or a combination of hardware, firmware and software. Embodiments may also be implemented as instructions stored on a computer-readable storage device, which may be read and executed by at least one data processing device to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, checkout terminals may include one or more data processing devices and may be configured with instructions stored on a computer-readable storage device.

What is claimed is:

1. A method for identifying an incorrect entry at a checkout terminal, comprising:
    determining from an image of a presented item that an identifier is attached to the presented item, the identifier including visible indicia indicating that the presented item is one of a plurality of visually similar items;
    receiving a selection of a selected item from the plurality of visually similar items;
    determining that the presented item differs from the selected item; and
    generating an alert output indicating that the presented item differs from the selected item.

2. The method of claim 1, wherein the visible indicia includes at least one of a logo, word, shape and color.

3. The method of claim 2, wherein the visible indicia includes the word organic.

4. The method of claim 3, wherein the plurality of visually similar items includes at least one item having a designation of certified-organic and at least one item lacking a designation of certified-organic.

5. The method of claim 1, wherein the plurality of visually similar items includes different varieties of a single species of produce.

6. The method of claim 1, wherein the plurality of visually similar items includes items priced differently.

7. The method of claim 6, wherein the selected item has a lower price than the presented item.

8. The method of claim 1, wherein the identifier includes at least one of a sticker adhered to the presented item, tape adhered to the presented item, tape adhered in a loop around at least a portion of the presented item, or a wrapper surrounding at least a portion of the presented item.

9. The method of claim 1,
    further comprising capturing the image of the presented item with an imaging device coupled to the checkout terminal; and
    wherein the selection is received as input at an input device coupled to the checkout terminal.

10. The method of claim 9, wherein generating the alert output comprises:
    triggering a visible or audible warning signal at a station spaced apart from the checkout terminal.

11. A method for identifying an incorrect entry at a checkout terminal, comprising:
    capturing an image of a presented item;
    determining from the image that an identifier is attached to the presented item, the identifier including visible indicia indicating that the presented item is one of a plurality of visually similar items;
    receiving a selection of a selected item from the plurality of visually similar items;
    determining that the selected item has a lower price than the presented item; and
    generating an alert output indicating that the presented item differs from the selected item.

12. The method of claim 11, wherein the visible indicia includes at least one of a logo, word, shape and color.

13. The method of claim 12,
    wherein the visible indicia includes the word organic; and
    wherein the plurality of visually similar items includes at least one item having a designation of certified-organic and at least one item lacking a designation of certified-organic.

14. The method of claim 11, wherein generating the alert output comprises:
    triggering a visible or audible warning signal at a station spaced apart from the checkout terminal.

15. The method of claim 11,
    wherein the image is captured with an imaging device coupled to the checkout terminal; and
    wherein the selection is received as input at an input device coupled to the checkout terminal.

16. A checkout terminal, comprising:
    a display;
    an input device;
    a camera;
    at least one data processing device coupled to the display, the input device, and the camera; and
    at least one memory device storing instructions executable by the at least one data processing device, the instructions being executable by the at least one data processing device to perform data processing activities, the data processing activities comprising:
        capturing, with the camera, an image of a presented item;
        determining, with the at least one data processing device, from the image that an identifier is attached to the presented item, the identifier including visible indicia indicating that the presented item is one of a plurality of visually similar items;

rendering a user interface on the display, the user interface configured to present the plurality of visually similar items;
receiving, at the input device, a selection of a selected item from the plurality of visually similar items;
determining, with the at least one data processing device, that the presented item differs from the selected item; and
generating an alert output indicating that the presented item differs from the selected item.

17. The checkout terminal of claim 16, wherein the visible indicia includes at least one of a logo, word, shape and color.

18. The checkout terminal of claim 17,
wherein the visible indicia includes the word organic; and
wherein the plurality of visually similar items includes at least one item having a designation of certified-organic and at least one item lacking a designation of certified-organic.

19. The checkout terminal of claim 16, wherein generating the alert output comprises:
triggering a visible or audible warning signal at a station spaced apart from the checkout terminal.

20. The checkout terminal of claim 15, wherein the checkout terminal is configured as a self-checkout terminal.

* * * * *